(No Model.)

C. M. KURTZ.
MACHINE FOR FORMING SHAPES OF CANDY.

No. 481,234. Patented Aug. 23, 1892.

WITNESSES:
J. C. Johnston
C. S. Johnston

INVENTOR
Charles M Kurtz
BY A. C. Johnston
ATTORNEY.

UNITED STATES PATENT OFFICE.

CHARLES M. KURTZ, OF ALLEGHENY, PENNSYLVANIA.

MACHINE FOR FORMING SHAPES OF CANDY.

SPECIFICATION forming part of Letters Patent No. 481,234, dated August 23, 1892.

Application filed August 14, 1891. Serial No. 402,677. (No model.)

*To all whom it may concern:*

Be it known that I, CHARLES M. KURTZ, of Allegheny, in the county of Allegheny and State of Pennsylvania, have invented a new and useful Improvement in Machines for Forming Shapes of Candy; and I do hereby declare the following to be a full, clear, and exact description thereof.

My invention relates to an improvement in machines for forming shapes of candy; and it consists in the combination and arrangement of parts, hereinafter described.

Figure 1:
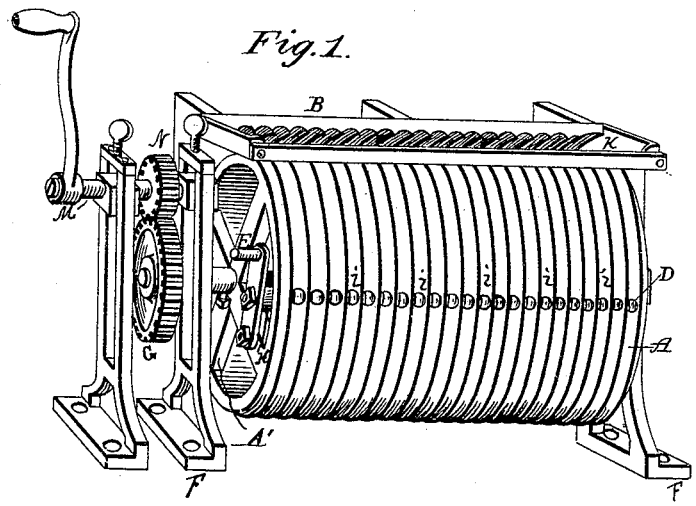
Figure 2:
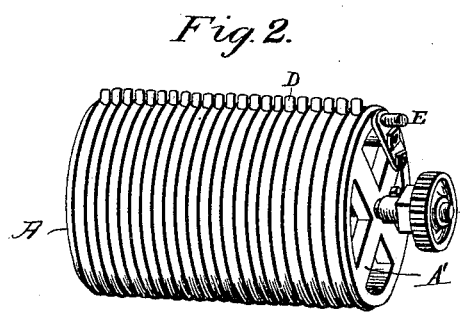
Figure 3:
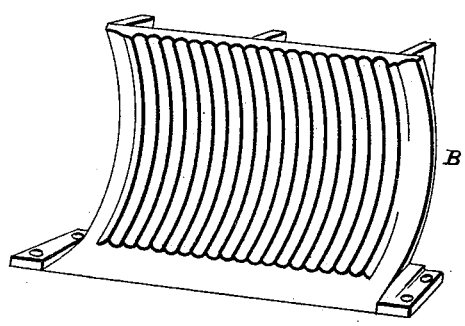

In the accompanying drawings, which form part of my specification, Figure 1 is a front elevation of my improvement. Fig. 2 is a face view of the cylinder. Fig. 3 is a face view of the case or shell which partly surrounds the cylinder.

In the drawings, A represents a grooved revolving cylinder, which is supported in a frame F. Partly surrounding the cylinder A is a shell or case B, having grooves which correspond in size and shape to the grooves in the cylinder A. This shell B is also bolted to the frame F.

E represents levers pivoted on the heads A' of the cylinder A, (one of which only is shown in the drawings,) and H is a rod connecting said levers and having a series of teeth or projections D mounted thereon, registering with, and projecting through openings $i$ in the cylinder. For convenience of operation I have provided the free ends of the levers with handles whereby the same may be actuated.

The operation is as follows: The candy while in a pliable condition is rolled out into a stick of suitable length and is fed into the opening K, and the revolving of the cylinder A will draw it between it and the shell B, where it is formed into shape, and the cutting-edges of the grooves of the shell gradually drawing closer to the cylinder near its lower edge the stick of candy will be nearly cut in two, and dropping from the machine it will break into different pieces. Should the candy at any time cling to the shell, by pulling the lever or crank E forward it will force the teeth or projections D on the rod H out through the openings $i$, and thereby clean it from the shell.

Steam or hand power can be used to operate the machine, the power being applied through the medium of the shaft M and gear-wheels N G.

Different shapes of candy balls can be made by using cylinders and shells in which the grooves are of different shapes.

Having thus described my improvement, what I claim is—

In a machine for forming shapes of candy, the combination, with the frame, of a revoluble cylinder mounted therein provided with corrugations on its periphery and a series of openings in said corrugations, a shell similarly corrugated and mounted on the frame, means for revolving the cylinder, levers pivoted on the heads of said cylinder, a rod connecting said levers, a series of teeth or projections mounted on the rod registering with and projecting through the openings in the cylinder, and handles on the levers, substantially as and for the purposes described.

In testimony whereof I have hereunto set my hand this 7th day of October, A. D. 1890.

CHAS. M. KURTZ.

Witnesses:
   A. C. JOHNSTON,
   I. C. JOHNSTON.